July 6, 1926.  
G. CONSTANT ET AL  
REDUCTION OF ORES WITH CONTINUOUS REGENERATION AND TRANSFORMATION OF THE RESIDUAL GAS PRODUCED DURING REDUCTION INTO FRESH REDUCING GAS  
Filed August 7, 1923  2 Sheets-Sheet 1

INVENTORS:  
Georges Constant  
and André Bruzac  
By  
ATTORNEY

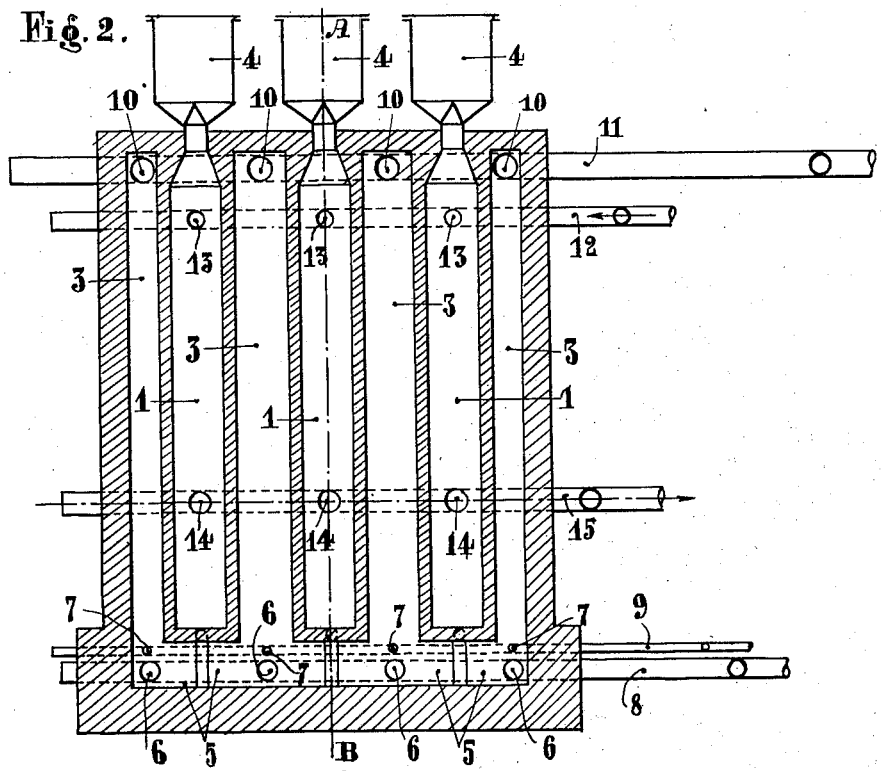
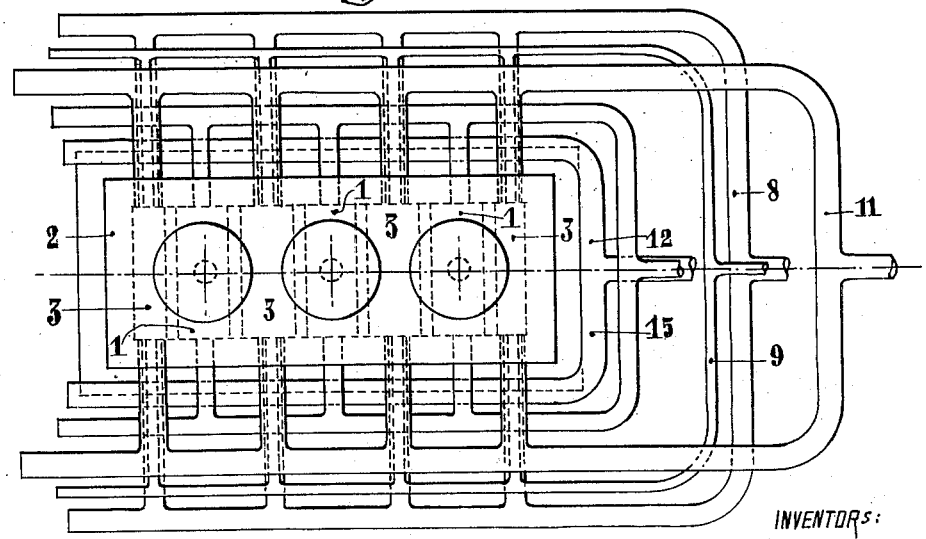

Patented July 6, 1926.

1,591,470

UNITED STATES PATENT OFFICE.

GEORGES CONSTANT AND ANDRÉ BRUZAC, OF PARIS, FRANCE.

REDUCTION OF ORES WITH CONTINUOUS REGENERATION AND TRANSFORMATION OF THE RESIDUAL GAS PRODUCED DURING REDUCTION INTO FRESH REDUCING GAS.

Application filed August 7, 1923, Serial No. 656,252, and in France August 22, 1922.

The present invention relates to the reduction of metal oxides and particularly of iron oxide, with the continuous regeneration and transformation of the residual gas produced during reduction into fresh reducing gas which is used anew in the reduction.

The invention consists essentially in producing, in a generator, preferably of producer gas, working with an air blast, or in any other suitable apparatus containing a fuel heated externally or internally to the required temperature, a single suitable charge of reducing gas; in passing this charge into a chamber containing metallic oxide to be reduced, the reduction being effected in this chamber, and the reducing gas being transformed into residual gas enriched in carbon dioxide; and in transferring the residual gas on leaving the reducing chamber into the producer, in which the air blast has been stopped, or into any other apparatus containing fuel at the required temperature, in which producer or other apparatus the carbon dioxide of the residual gas, on contact with the carbon of the fuel contained therein, is transformed into reducing carbon monoxide which is again employed in the reducing chamber, and so on, these operations being repeated in a continuous manner for the entire duration of the reducing action; the producer or the like apparatus acting only as a producer for fresh reducing gas at the beginning of the reduction, its function during the remainder of the reaction being merely that of regenerating reducing gas from the residual gas produced in the reaction.

The continuous circulation of the gaseous mixture may be produced in any suitable manner. For example a blower may be used which acts on the residual gas on leaving the reducing chamber and forces it into the producer or other apparatus in which the regeneration of the reducing gas is effected, a suitable cooler being interposed between the reducing chamber and the blower in order to prevent deterioration of the latter owing to the excessive heat of the residual gas.

In case a gas producer with an air blast is used, a gasometer should be interposed in the conduit leading the gas from the producer to the reducing chamber, so that the reduction is continuous and not interrupted when—in order to maintain combustion in the producer—it is necessary periodically to cut it out of the circuit in order to blow in fresh air. This gasometer is provided with a pipe system and a relief valve to lead off the excess reducing gas to other apparatus where it may be used.

In order more clearly to understand the invention reference is made to the accompanying drawings which show by way of example one way of carrying the invention into practice. In said drawings:—

Figure 1 is a diagrammatic elevation of an installation for the reduction of ores in accordance with the process of the invention.

Figs. 2, 3 and 4 represent an apparatus which may be used for the regeneration of the residual gas into fresh reducing gas.

Fig. 2 is a longitudinal section of this apparatus;

Fig. 3 is a transverse section along the line A—B of Fig. 2, and

Fig. 4 is a plan view.

In Fig. 1, A indicates a reducing chamber containing metal oxide, for example iron oxide, to be reduced; and B indicates a producer having connected to it an air pipe or conduit I' leading from a blower I and fitted with a valve D. The producer gas obtained in the producer B leaves the latter under a slight pressure and at a suitable temperature, through a two-way valve E which is fitted in a pipe or conduit K, one branch of which leads to a reservoir F. In the position shown in Fig. 1, the valve E opens up the branch mentioned and cuts out the other branch, so that the producer gas flows to the reservoir, whence it is supplied through a pipe F' to the top of the reducing chamber A.

The ore contained in chamber A is reduced by the carbon monoxide of the producer gas, which leaves the central portion of said chamber in the form of residual gas consisting of carbon dioxide and nitrogen $(CO_2+N_2)$ and passes through a pipe or conduit G' to a cooler G. The latter has connected to its bottom portion a pipe H' wherein a blower H is included, so that said blower thus acts to exhaust the cooled residual gas from the cooler and force it into producer B, the valve C in pipe H' being open at that time, and the valve D closed, as will be understood.

On entering the producer B, the $CO_2$ of the residual gas is transformed into CO, due to the action of the oxygen of the ore and the carbon of the fuel contained in the reproducer, and a reproducing gas is reconstituted, containing twice the volume of CO contained in the original producer gas supplied to the reducing chamber according to the reaction:

$$CO_2+C+N_2=2CO+N_2$$

which takes place in the producer.

This new reducing gas is then supplied from the producer to the recervoir F and thence to the reducing chamber A, as before, where it reduces the ore and is converted into residual gas, $2CO_2+N_2$; the excess CO in the reservoir being discharged therefrom through a conduit J equipped with a relief valve (not shown) and delivered to some part of the works where it can be utilized as desired. The residual gas $2CO_2+N_2$ leaving the reducing chamber passes to cooler G, and thence to the producer B where it is retransformed according to the reaction:

$$2CO_2+N_2+2C=4CO+N_2$$

and so on, the volume of reducing carbon monoxide delivered to the reducing chamber A increasing with each regeneration in the producer B, while the quantity of nitrogen remains unchanged.

It will thus be seen that a reducing gas containing practically pure carbon monoxide can be rapidly obtained, and that at the end of the reduction a quantity of carbon monoxide which is proportional to the quantity of oxide contained in the ore will have been produced.

In order to maintain combustion in the producer, it is advisable to periodically cut it out of the circuit and to blow air therethrough, this being effected by closing valve C and opening the valve D in the air pipe I', and by turning the two-way valve E in pipe K so as to connect the right-hand or discharge branch of said pipe with the producer. The producer gas obtained during the blast is discharged through said branch and led to a point where it can be used; while that obtained during the normal working of the producer accumulates in the reservoir F (which is preferably in the form of a gasometer and is equipped with a manometer M), so that it can be used during the time that the producer is out of circuit and air is being blown therethrough, thereby insuring continuous reduction.

The endothermic reaction $CO_2+C=2CO$ may be carried out in a slag-melting producer by burning the quantity of coke necessary to continually maintain equilibrium in the producer. The result is a gas containing about 58% CO and 42% N; that is to say, a good gas for reducing and melting.

Instead of using a single producer, two producers B and B' may be used for ensuring a continuous reduction while at the same time allowing the periodical air-blowing of the producers. Such an arrangement of two producers enables the capacity of the gasometer F to be reduced.

The producer B' is provided in the same way as the producer B with a two-way cock E' controlling a pipe-system leading to the reservoir F, and with two valves C' and D' controlling the conduits H' and I' connecting this producer on the one hand to the blower H and on the other hand to the blower I. By means of these two producers and by operating the valves C, D, E and C', D', E', one of the producers can be cut out and worked with an air blast, whereas the other producer which is in circuit, assures the continuity of the regeneration of the reducing gas.

The process may for example be carried out as follows: The original charge of carbon monoxide and nitrogen delivered by the producer B is sent to the chamber A where it reduces the ore and is transformed into carbon dioxide and nitrogen. This residual gas is conducted to the producer B—the valve C having been opened and the valve D closed—where it is transformed into two parts of carbon monoxide plus nitrogen.

This new reducing gas is thereupon returned to the reducing chamber A, which is immediately afterwards isolated from the producer B by means of the cock E, while the valve C is closed and the valve D opened in order to recommence the blowing of the producer B, the producer gas obtained being conducted through the right-hand or discharge branch of the conduit K to any point where it is intended to be used.

The reducing gas $(2CO+N_2)$ led to chamber A and transformed into $2CO_2+N_2$ is thereupon conducted into the producer B' through the left-hand branch of pipe H' and the opened valve C' while the air blast is stopped by closing the valve D' and the valve D of the producer B is opened.

The following reaction thereupon takes place in the producer B':

$$2CO_2+N_2+2C=4CO+N_2.$$

During the blowing periods of the producers, the coke burned in order to produce the carbon monoxide of the producer gas, compensates the heat lost in the regeneration of $CO_2$ into CO. These blowing periods may be of any desired length, for example, 10, 15 or 20 seconds. In any case, that time is taken which has been found most suitable.

The blowing of the producer is, as has been seen, intermittent and is effected by the blower I or by any other suitable apparatus.

The producer gas is generally produced by means of coke. If any volatile matter is to be prevented from entering the reduction chamber, it is sufficient to stop the reduction a little each time a producer is charged and to work with producer gas, as it is well known that volatile substances are set free soon after the producer has been charged. Inasmuch as the reducing chamber or the reservoir is supplied only once with producer-gas, it is evident that all fuels can be used and that the carbon monoxide will very rapidly become practically pure.

If it should be necessary to increase the temperature of the reducing gas above that at which it leaves the producer, heat regenerators or interchangers may be introduced at any suitable point of the circuit. In the same way, cooling means may be introduced if it is necessary to lower the temperature of the reducing gas.

The installation may be supplemented by various indicating devices in order to enable the progress of the reduction in the chamber A to be observed at any given moment. Thus, for example, a pyrometer or thermostat or any other apparatus P indicating the temperature in the chamber A, and a detecting apparatus T indicating the presence of carbon dioxide, may be interposed in the conduits leading the residual gas from the reducing chamber to the cooler G.

As long as this detecting apparatus, which may be a lime water scrubber or a similar apparatus, indicates the presence of $CO_2$ in the residual gas, the reduction is not complete. On the other hand the absence of $CO_2$ indicates that only CO passes through the apparatus and that consequently the reduction is finished.

It should be understood that the above-described installation for the carrying out of the present process is only given by way of example, and that the number, shape, dimensions and arrangement and the details of construction of the various parts constituting the installation can be modified without departing from the essence of the invention.

The necessary valves are arranged at any desired place and may be cooled if required.

The valves or distributors may be controlled by hand or automatically. The conduits and all other parts of the piping system may be internally or externally heat-insulated as desired.

The necessary control apparatus may be installed at any convenient place.

The reduction process of the present invention presents the advantage of effecting a great economy and avoiding any loss of gas.

It should be well understood that a plurality of reducing chambers may be used instead of one reducing chamber. Moreover the number of producers used can be altered in accordance with the size of the installation.

For continuous working, the producers should be at least two in number. According to the size of the melting furnace they supply at least two reducing chambers and if necessary more. The air blast is heated.

The conduits leading the hot blast to the producer, and those for the $CO_2$ or the $CO_2+CO$ are arranged in horizontal planes at a suitable distance apart and may be inclined. This ensures that a sufficient amount of coke at a high temperature always remains between that part of the air of the blast remaining in the conduit and the mixture of $CO_2+CO$ introduced into the producer, whereby the air remaining in the conduit and oxidizing the carbon of the coke never oxidizes the CO introduced at the same time as the $CO_2$.

It is preferable to arrange the exit ports for the CO from the producers in the zone of the red hot coke and to ensure that this exit of CO always takes place in the presence of the coke even in cases where the producers, instead of being supplied with coke, are supplied with lignite or mixed fuels. The gases for the regenerators and for motive power (blast gas) are removed at the upper part of the producers.

As previously explained above, when the producer gas is employed for starting the operation, this gas is gradually purified and its nitrogen contents finally become insignificant in relation to the amount of carbon monoxide.

The reduction may moreover be carried out by starting with absolutely pure carbon monoxide. It is then sufficient to have a certain amount of carbon monoxide for starting the reduction in reserve in a small gas holder. The initial reserve of CO may be produced in any suitable manner, for example by the action of pure oxygen on carbon contained in gas producers.

This reserve of carbon monoxide need not be very large. It is only necessary to have sufficient to fill the reduction chamber or chambers and the conduits once, because, after reduction, the $CO_2$ produced during reduction and leaving the reducing chamber or chambers will be regenerated as pure carbon monoxide in the producer in the manner previously explained.

In the above explained method of operation, it can be seen that the residual gases obtained from the reduction of the ore are regenerated by causing them to pass through one of the producers in which the air blast has been stopped, and where the carbon dioxide is converted into carbon monoxide on contact with the carbon of the fuel of the producer or producers according to the reaction $CO_2+C=2CO$.

In order to maintain combustion in the producer or producers, it has been pointed out that the producer should be periodically cut out and blown with air in such a way as to generate producer gas, this producer gas furnishing the necessary heat to compensate for that absorbed in the regeneration reaction $CO_2+C=2CO$.

The fuel for the gas producers thus serves on the one hand to regenerate the carbon dioxide and on the other hand to generate producer gas.

Finally in order to avoid the fuel consumption which takes place during the blowing of the producer and thus to effect an appreciable economy, the following modus operandi can be adopted which allows the regeneration reaction $$CO_2+C=2CO$$

to take place without the production of producer gas, the fuel being consumed only during said reaction.

This mode of operation consists in charging the fuel intended for the regeneration reaction into a closed receiver which is brought by either external or internal heating to the requisite temperature for said reaction. If it is desired to melt the clinkers the receiver is similarly further heated either in a continuous manner if the fuel is maintained constantly at a sufficiently high temperature or intermittently by suitably intensifying the heating at desired intervals.

The operation may for example be carried out in the following manner which consists in bringing the solid fuel, for example coke, to the temperature necessary not only to effect the reaction $CO_2+C=2CO$, but also to melt the clinkers, by charging this coke into receivers of refractory material adapted to withstand high temperatures, such for example as chrome steel, and in heating it under exclusion of air in the same manner as fuel for the production of coke is externally heated in coke furnaces from the outside of the receivers, the heat being communicated thereto through the walls and the bottom of the coke receivers, the external heating of the coke receivers being conducted in such a manner as to maintain the coke continuously at a temperature permitting the reaction $CO_2+C=2CO$ to take place.

Under these conditions the $CO_2$ from the reducing chamber continuously enters the coke receiver during the entire period in which the ore is reduced, and is transformed into CO which is used again for reducing ore and for smelting, in a Martin or other furnace, the metal obtained from another reducing chamber.

The same pressure is maintained at the inside as at the outside of the coke receiver.

In this manner only the coke containing the carbon necessary for the reduction to CO, is consumed in the coke receivers and, as previously stated, the carbon monoxide is entirely consumed in the smelting furnaces or is otherwise employed. This mode of operation allows the producer or producers to work continuously to regenerate the carbon dioxide. It consequently allows the air blast to be dispensed with, obviates the presence of any nitrogen in the producer gas and also allows the hereinbefore described valves or other reversing or cut-out devices to be dispensed with.

The coke receivers are externally heated by any fuel suitable for the special mode of heating, and the residual combustion gases from this heating give up their remaining sensible heat for the production of steam, for preheating air, or for any other purposes.

Figs. 2, 3 and 4 represent by way of example a practical embodiment of an installation for carrying out the above-described method of operation.

1 shows the different receivers containing the fuel. While only three receivers are shown in the drawings, any desired number may be employed.

A casing 2 surrounds the receivers leaving hollow spaces 3 in which the heating gases circulate. The burning gases pass along the outer surfaces of the receivers 1 and thus bring said receivers and their contents to the desired temperature.

At the upper part of each receiver 1 is arranged a feed hopper 4 for the introduction of the fuel necessary for the transformation of $CO_2$ into CO.

5 indicates the combustion spaces or chambers of the gas or other fuel serving to reheat the receivers 1. 6 indicates the air inlets and 7 the inlets for the gas or other heating medium into the combustion chambers 5, said inlets being connected to their respective supply sources of air or fuel 8 and 9 respectively.

10 indicates the orifices through which the residual heating gases escape to a collecting main 11. These gases, which, after leaving the heating spaces 3, are still at a high temperature, may be used for preheating air or for any other purposes.

The $CO_2$ from the reducing chamber passes through the collecting main 12 and is introduced into the receivers 1 through the openings 13 at the zone where the temperature of the coke is maintained in a continuous manner at at least 1000° C.; it traverses the coke and reaches zones of increasing temperature which, at the foot of the receivers where the clinkers are, melted range between 1200° and 1400° and even 1500° C. according to the fuel used (coke or other fuel).

The reaction $CO_2+C=2CO$ is thus effected in a continuous manner under excellent conditions.

The carbon monoxide formed, escapes through the branch conduits 14 of the collector 15 and is transferred for example to the reduction chamber and to the Martin furnace.

The carbon monoxide intended for the reduction of the ore is brought to a suitable temperature before it enters the reducing chamber, the temperature at which the reduction is carried out being actually less than that at which the materials agglomerate. For this purpose the carbon monoxide may be passed through one or more heat interchangers where it gives up its excess sensible heat in the interests of the economy of the process.

The slag is removed at the bottom of the receiver 1 through the tap holes 16.

One or more blowers are used in the reduction cycle for regulating the passage of the reducing gases and residual gases of the reduction.

As these gases are at a temperature of about 800° C. which is inadmissible as regards the physical properties of metals and lubrication, the blowers employed are of a special construction allowing cooling of all the revolving parts and of even the exterior casing. Thus for example the shaft or shafts may be hollow, the eight vanes for example of the Root-blower type may likewise be cooled without the cooling medium being able to mix with the gas, and the casing may also be cooled as well as the blades. The same measures should be taken in cases where pumps or other like apparatus are employed.

In the hereinbefore described process the external heating of the receivers has been effected in such a manner as to maintain the lower part of said receivers at a temperature at which the clinkers are caused to melt in a continuous manner, i. e. at a temperature of about 1400 to 1500°, whereas the temperature required for the reaction $CO_2+C=2CO$ to take place is only 1000–1100° C.

The process may however be carried out in a different manner by controlling the heating in such a manner as to bring and maintain the coke receivers at a temperature of about 1050° C. Under these conditions the reactions $CO_2+C=2CO$ takes place in a continuous manner but the clinkers are no longer melted. From time to time, for example every hour, the clinkers are melted and removed by temporarily bringing the lower part of the receptacle to the necessary temperature (1400° to 1500° C.). For this purpose the external heating may be regulated or a quantity of air may be introduced in the lower part of the receiver through a conduit (not shown in the drawings) sufficient to burn a certain quantity of fuel (coke) adapted to produce the temperature requisite for the melting of the clinkers to take place. It is evident that in this latter case the reduction should be stopped every time the clinkers are to be melted.

It should be understood that the direction of the circulation of the carbon dioxide and carbon monoxide through the interior of the receiver, as well as that of the heating gas in the retort may be reversed.

The above arrangement is given merely by way of example, and may be modified both as regards the shape of the fuel receivers and the distribution of the heating.

It should be well understood that many changes and modifications may be made in the present invention without departing from the spirit and scope thereof, it being our intention to claim the same broadly in whatever form its principles may be employed.

Having now particularly described and ascertained the nature of our said invention as well as the manner in which the same is to be performed, what we claim as new is:

1. A continuous, cyclic process of reducing ores comprising the steps of passing an initial charge of reducing gas into a chamber containing the ore to be reduced; discharging the oxidizing residual gas leaving said chamber into and through a vessel containing a body of heated carbonaceous fuel to convert the carbon dioxide of the residual gas into carbon monoxide; passing the regenerated carbon monoxide gas into the reducing chamber; passing the residual carbon dioxide gas obtained after reduction by the regenerated reducing gas through said fuel-containing vessel to again regenerate the gas; repeating the reducing and regenerating operations until reduction is complete, the volume of carbon monoxide contained in the gas supplied to the reducing chamber increasing at each regeneration until said gas consists of practically pure carbon monoxide; and periodically injecting a blast of air through the fuel-containing vessel during the above procedure to raise the temperature of the fuel and thereby maintain the minimum temperature required.

2. A continuous, cyclic process of reducing ores, comprising the steps of passing an initial charge of reducing gas into a chamber containing the ore to be reduced; discharging the oxidizing residual gas leaving said chamber into and through a vessel containing a body of heated carbonaceous fuel to convert the carbon dioxide of the residual gas into carbon monoxide; passing the regenerated carbon monoxide gas into the reducing chamber; passing the residual carbon dioxide gas obtained after reduction by the regenerated reducing gas through said fuel-containing vessel to again regenerate the gas; repeating the reducing and regenerating operations until reduction is complete, the volume of carbon monoxide contained in the gas supplied to the reducing chamber increasing at each regeneration until said gas consists of practically pure carbon monoxide; periodically injecting a blast of air through the fuel-containing vessel during the above procedure to raise the temperature of the fuel and thereby maintain the minimum temperature required; and cutting the fuel-containing vessel out of the reducing circuit upon each injection of air thereinto and at the same time cutting a second fuel-containing vessel into said circuit to take the place of the vessel cut out.

In testimony whereof we affix our signatures.

ANDRÉ BRUZAC.
GEORGES CONSTANT.